(12) United States Patent
Boehmer et al.

(10) Patent No.: US 11,402,626 B2
(45) Date of Patent: Aug. 2, 2022

(54) DEFLECTOR

(71) Applicant: RAYLASE GmbH, Wessling (DE)

(72) Inventors: Carl Boehmer, Gilching (DE); Wolfgang Lehmann, Germering (DE); Christian Schiefen, Gauting (DE); Philipp Schoen, Buch am Ammersee (DE)

(73) Assignee: RAYLASE GmbH, Wessling (DE)

( * ) Notice: Subject to any disclaimer, the term of this patent is extended or adjusted under 35 U.S.C. 154(b) by 482 days.

(21) Appl. No.: 16/342,250

(22) PCT Filed: Oct. 27, 2017

(86) PCT No.: PCT/EP2017/077686
§ 371 (c)(1),
(2) Date: Jun. 25, 2019

(87) PCT Pub. No.: WO2018/078137
PCT Pub. Date: May 3, 2018

(65) Prior Publication Data
US 2019/0310463 A1 Oct. 10, 2019

(30) Foreign Application Priority Data
Oct. 27, 2016 (DE) ..................... 10 2016 120 523.0

(51) Int. Cl.
*G02B 26/08* (2006.01)
*G02B 26/10* (2006.01)
(Continued)

(52) U.S. Cl.
CPC .......... *G02B 26/101* (2013.01); *B23K 26/032* (2013.01); *B23K 26/082* (2015.10);
(Continued)

(58) Field of Classification Search
CPC ...... G02B 26/101; G02B 7/04; G02B 15/142; G02B 26/0816; G02B 27/09;
(Continued)

(56) References Cited

U.S. PATENT DOCUMENTS

2005/0150876 A1 7/2005 Menin et al.
2009/0206065 A1 8/2009 Kruth et al.
(Continued)

FOREIGN PATENT DOCUMENTS

| DE | 19828723 A1 | 1/2000 |
|---|---|---|
| DE | 102013017795 B3 | 2/2015 |
| KR | 20120114651 A | 10/2012 |

OTHER PUBLICATIONS

International Search Report dated Mar. 2, 2018 for International Application No. PCT/EP2017/077686.

*Primary Examiner* — Euncha P Cherry
(74) *Attorney, Agent, or Firm* — Eschweiler & Potashnik, LLC

(57) ABSTRACT

The present invention relates to a deflection unit (10) having an optical element (20), which partly reflects a first wavelength and which partly transmits a different, second wavelength. The deflection unit defines an operating beam path traversed by the operating beam (14) from a first window (12) to a second window (24) via a reflection at the optical element (20). The deflection unit comprises an XY-deflection device (22), which is arranged in the operating beam path in order to scan the operating beam that has emerged, a focusing device (16) for focusing the operating beam (14), wherein the focusing device has a variable focal length and is arranged in the operating beam path between the first window (12) and the optical element (20).

37 Claims, 5 Drawing Sheets

(51) Int. Cl.
   *B33Y 30/00*     (2015.01)
   *B29C 64/264*    (2017.01)
   *G02B 7/04*      (2021.01)
   *G02B 27/09*     (2006.01)
   *B23K 26/082*    (2014.01)
   *B23K 26/03*     (2006.01)
   *B23K 26/342*    (2014.01)
   *G02B 15/14*     (2006.01)
   *G02B 27/10*     (2006.01)

(52) U.S. Cl.
   CPC .......... *B23K 26/342* (2015.10); *B29C 64/264* (2017.08); *B33Y 30/00* (2014.12); *G02B 7/04* (2013.01); *G02B 15/142* (2019.08); *G02B 26/0816* (2013.01); *G02B 27/09* (2013.01); *G02B 27/108* (2013.01)

(58) Field of Classification Search
   CPC .. G02B 27/108; B23K 26/032; B23K 26/082; B23K 26/342; B29C 64/264; B33Y 30/00
   USPC ....................................................... 359/214.1
   See application file for complete search history.

(56) References Cited

U.S. PATENT DOCUMENTS

| | | |
|---|---|---|
| 2010/0253830 A1 | 10/2010 | Iwasawa |
| 2014/0263221 A1* | 9/2014 | Minehara ............... B23K 26/08 219/121.73 |
| 2015/0338210 A1 | 11/2015 | Lessmueller et al. |
| 2015/0367453 A1 | 12/2015 | Herzog |
| 2016/0114432 A1 | 4/2016 | Ferrar et al. |
| 2018/0039042 A1* | 2/2018 | Suzuki .................. G02B 7/023 |

\* cited by examiner

DEFLECTOR

This Application is a National Phase Entry of PCT/EP2017/077686, filed on Oct. 27, 2017, which claims priority to German Application number 10 2016 120 523.0, filed on Oct. 27, 2016. The contents of the above-referenced Patent Applications are hereby incorporated by reference in their entirety.

TECHNICAL SUBJECT AREA

The present invention is in the field of laser manufacturing and laser machining technology and relates to a deflection unit.

BACKGROUND

Deflection units are used in a wide range of industrial manufacturing and machining processes to manipulate the path of laser beams in space and time so as to scan them over a working surface within a work area.

An example application area of deflection unit is laser-based additive manufacturing. Additive manufacturing offers a high level of design freedom in component design and is particularly well suitable for rapid model building, also known as "rapid prototyping".

In addition to the use in rapid prototyping, additive manufacturing is also increasingly used for industrial production with larger unit quantities, so that the field of application of additive manufacturing is expanding from rapid prototyping to include industrial mass production or so-called "rapid manufacturing". In this context, additive finishing in industrial production is gaining increasing importance, for example with regard to the processing of metals and in the areas of aviation and medical technology. In addition, it has the potential to replace many classical industrial manufacturing processes, such as casting.

Laser-based additive manufacturing encompasses the processes of "Direct Powder Fusion", i.e. a process in which by means of a laser beam, for example a high-energy laser beam, a powder bed is locally and selectively melted, "Vat Photopolymerization", i.e. a process in which a bath of a material, such as a resin, is selectively and locally exposed by means of a laser and thus hardened, and "Direct Energy Deposition", i.e. a method in which powder is introduced parallel to or in the same direction as the laser radiation in order to deposit material. These processes are surface-based assembly processes, in which a volume is generated layer by layer. In these processes the laser beam steered by the deflection unit is scanned over a planar working surface, such as the surface of a plastic bath or vat (Vat Photopolymerization) or of a powder bed (Direct Powder Fusion), in order to bring about a laser-induced polymerization of the plastic or a fusion or sintering of the powder grains at selected areas of the surface layer. This generates a new component layer or component level that is materially bonded to the underlying component layer. This is repeated layer by layer, wherein the previously finished component layers are lowered in relation to the deflection unit and a new layer of loose material, e.g. non-polymerized plastic or powder, is deposited over the most recently produced layer. Then the laser scanning process is applied to the new layer according to the shape of the component to be produced.

Such laser- and surface-based additive assembly processes can proceed relatively rapidly within a level, for example, up to 4 m/s, but due to the large number of layers that are required to produce a component, they may take several days, in which the process is carried out around the clock. In this case, the accuracy requirements, which can be in the range of 10-20 µm or less, are very high.

Even the smallest process deviations can result in the required accuracy not being maintained across the entire component volume. This can either lead to a time-intensive post-processing being required, where this is possible. If this is not readily possible, for example, due to faults within the component, it may also be necessary to re-manufacture the entire component. In addition, it is possible that process deviations remain undetected.

To avoid this, and in order to be able to take corrective action immediately in the event of process errors, it is necessary to observe and monitor the process during production. Such an online quality control in combination with an open-loop and/or closed-loop process control enables process-related component faults to be resolved immediately or completely avoided. This allows the process efficiency, the process reliability and the throughput to be significantly improved and classical, volume-based manufacturing processes, such as casting, to be replaced.

DE 10 2013 017 795 B3, for example, discloses a laser-scanner welding device, which comprises a deflection unit for scanning a laser beam and an internal camera for an online quality control. In this device, by means of a dichroic mirror the operating beam path is superimposed with the camera's field of view, so that when scanning using a scanning mirror the field of view of the camera is moved over the workpiece synchronously with the operating laser beam. Between the dichroic mirror and the scanning mirror a movable focussing lens is arranged in the operating beam path and in the imaging beam path to adjust the focal point of the laser beam.

SUMMARY OF THE INVENTION

The object of the present invention is to provide a deflection unit which allows an improved laser machining process and an improved process observation, process monitoring, process supervision and process control, in particular in a laser-based additive manufacturing process.

This object is achieved by the subject matter of Claim 1. Advantageous embodiments and extensions are specified in the dependent claims.

The present invention relates to a deflection unit, in particular for laser manufacturing and for monitoring a laser manufacturing process. The deflection unit according to the invention comprises a first window through which an optical operating beam can enter the deflection unit, a second window through which the operating beam can exit from the deflection unit and through which detection beams can enter the deflection unit from an operating region along the respective trajectory of the emerging operating beam and in the opposite direction thereto, an optional first detection device, preferably within the deflection unit, and an optical element, which at least partially reflects a first wavelength, and which also optionally at least partially transmits at least one other second wavelength. The deflection unit defines an operating beam path traversed by the operating beam from the first window to the second window via a reflection at the optical element. The first window corresponds to the operating beam inlet, for example, a fibre end, through which the operating beam enters the deflection unit.

If the deflection unit comprises a first detection device, the deflection unit also defines a detection beam path, which the detection beams traverse from the second window to the first detection device, wherein the detection beams are transmitted at least partially by the optical element.

The deflection unit also comprises an XY deflection device, which is arranged between the second window and the optical element in the operating beam path and, if the first detection device is present, in the detection beam path in order to deflect the operating beam, to scan the emerging operating beam and, if appropriate, at the same time to deflect the detection beams so that they traverse the detection beam path through the optical element as far as the first detection device, a focussing device for focussing the operating beam, wherein the focusing device has an adjustable focal length and is arranged in the operating beam path between the first window and the optical element.

If the first detection device is present, the deflection unit can also comprise an optical apparatus, which is arranged in the detection beam path between the optical element and the first detection device and which is configured to change a focal length for the detection beams (32).

The variable focal lengths in each case, given a suitable control, allow a respective adjustment to different deflection angles for a given working distance, i.e. a so-called plane-field compensation, as well as an adjustment to different working distances. "Variable focal length" can mean, in particular, that the focal length is adjustable and/or that a focus tracking is possible during the process. A rigid fixed set of optics with fixed focal length therefore does not have a variable focal length. The possibility of a plane-field compensation is particularly advantageous for laser-based additive manufacturing, in which the laser is scanned over a planar, smooth working area and can always be or remain focused on the surface of the working area.

In contrast to the above-mentioned prior art, the deflection unit according to the invention comprises a focusing device and, optionally, an optical apparatus for providing a variable focal length for the operating beams or for the detection beams to be detected. In this case the focussing device is arranged only in the operating beam and the optical apparatus can be arranged only in the detection beam path. As a result of this decoupling it is possible to change or adjust the focal position of the operating beam, without at the same time affecting the detection using the first detection device, and also to adjust and vary the detection using the first detection device, without at the same time affecting the laser operating process. As a result, the process observation with the first detection device can be constantly optimized in relation to the respective monitoring requirements, which can also change during the course of the process, and at the same time the laser process can be constantly optimized in relation to the respective process requirements, which can also comprise a variation of the focal position and/or the focussing shape during the process.

The decoupling of the focussing device and the optical apparatus means that they can be controlled independently of each other, so that each of the different requirements can be optimized independently. In addition, the respective controllers do not need to allow for or compensate any influence of the other controller, because as a result of the decoupling no interaction between an adaptive detection with the first detection device and an adaptive focussing of the operating beam is necessary. Therefore, the deflection unit according to the invention enables a more flexible and thus more efficient operating process with an optimized process monitoring, and a more robust and more fault-tolerant, more reliable and more accurate operating and monitoring process with simultaneous process execution, which is necessary for effective process observation, process monitoring, process supervision, process open-loop and/or closed-loop control.

The focussing device is preferably configured to change the focal length as a function of a setting of the XY-deflection device and/or a working distance. This allows the focal length to be adjusted to the respective angle of deflection, so that a plane-field compensation can be performed, and the focus can be kept in a plane during the scanning process. Alternatively or additionally, through a focal length variation, for example by a relatively large offset value, the working distance can be changed.

The focussing device can comprise one or more moveable lenses or lens groups and be configured to move a lens or lens group or a plurality of the lenses or lens groups jointly along the operating beam path. This allows the focal length and therefore the focal position to be changed. "Group of lenses" herein refers to a series of lenses arranged closely one behind the other that have the same function as a corresponding single lens.

In one or more of the above-mentioned embodiments, the focussing device can be configured to change the focussing diameter of the operating beam without at the same time changing the focal position. In other words, the degree of focussing and thus the intensity on the respective work surface can be enlarged or reduced, without the beam caustic being changed and without the focus position being changed. This allows the respective intensity on the work surface during the scanning process to be adapted to different conditions, without the focus being removed from the working surface. Therefore, the flexibility and efficiency of the laser process can be increased.

In the above embodiments the focusing device can comprise, for example, a plurality of moveable lenses and the deflection unit can be configured to move at least two lenses independently of each other at the same time. This allows, for example, the at least two lenses to be moved in opposite directions at the same time. This allows the degree of focussing to be changed without the focal position being changed at the same time. In some embodiments, the lens movement can be a combination of a movement in opposite directions and a joint, directionally aligned movement not in opposite directions, so that given an appropriate control, the focal position and degree of focussing can be changed at the same time.

In preferred embodiments the focussing device comprises a first movable lens, a second movable lens and a fixed lens, wherein the second movable lens is arranged after or behind the first movable lens in the beam direction of the operating beam and wherein the fixed lens is arranged after or behind the first movable lens and the second movable lens in the beam direction of the operating beam. It goes without saying that in this context the first and the second movable lens can each be formed by a first and a second movable lens group. The fixed lens can also be formed by a fixed group of lenses. Therefore, all features described in the following for the first movable lens, the second movable lens and the fixed lens also apply to the respective lens groups if these are present.

The first moveable lens and the second movable lens can be moved along the operating beam path jointly and in the same direction or else independently of each other. The operating beam propagates sequentially first through the first movable lens, then through the second movable lens, and lastly through the fixed lens. The fixed lens is used to focus the operating beam on the working area. One or more of the first movable lens or the lenses of the first lens group, the second movable lens or the lenses of the second lens group and the fixed lens or the lenses of the fixed lens group may also have one or more aspherical surfaces.

In some embodiments a distance between the object-side main plane of the first movable lens and the first window does not differ from the focal length of the first moveable lens by more than 50%, preferably by no more than 30%, particularly preferably no more than 10%. The operating beam can thus enter the deflection unit in a divergent manner and a beam waist of the operating beam can be located within the first window. The above-mentioned distance thus always varies in a small range around the focal length of the first movable lens, which ensures that at each focal position there is a range of the imaging ratio of the focusing device, in which the diameter of the operating beam, i.e., the spot size, on the second movable lens is about the same size as or larger than it is on the first movable lens. Since thermal lens effects scale according to an inverse square law with the beam diameter, the influence of the thermal variations of the second movable lenses on the entire focusing device can therefore be minimized, thereby enabling thermally induced uncontrolled variations of the focal position and the imaging ratio of the focussing device to be avoided.

In some embodiments the distance between the first movable lens and the second movable lens is selected such that the axial position of a virtual image produced by the first and the second movable lens can vary within a range which corresponds to the adjustment range of the second movable lens. The second movable lens is movable along the operating beam path within this adjustment range. This condition can be regarded as a lower limit for the distance between the first movable lens and the second movable lens, with larger distances also being possible.

This allows the focussing of the operating beam on the working area to be kept constant by a corresponding displacement of the second movable lens while at the same time varying the imaging ratio of the focusing device. This can be achieved by the second movable lens being positioned such that a distance D between a virtual image of the first window generated by the first and second movable lenses, or between the operating beam feed and the object-side main plane of the fixed lens, always remaining constant for a given desired focal position of the focusing device. This distance D (in a paraxial approximation) is given by a distance between the image-sided main plane of the fixed lens and the desired focal position $\Delta$ of the focusing device, and by the focal length of the lens equation $f_F$ of the fixed lens according to the lens equation below:

$$\frac{1}{D} + \frac{1}{\Delta} = \frac{1}{f_F}.$$

In some embodiments, the first movable lens, the second movable lens and the fixed lens have a positive focal length, a negative focal length and a positive focal length respectively. Therefore, the operating beam can be collimated by the first movable lens. After its passage through the first movable lens, the operating beam can be either convergent or divergent, depending on the distance between the first movable lens and the first window.

According to preferred embodiments the focal lengths and the positions of the first movable lens and the second movable lens are selected such that the focussing device has no focus which is located between the first movable lens and the fixed lens. Therefore, the focusing device has no other focus apart from the operating beam entrance itself and the focus on the working area.

The distance between the first movable lens and the first window can be reduced by displacement of the first movable lens along the operating beam path, so that the operating beam is divergent between the first movable lens and the second movable lens and the imaging ratio, and hence the focus diameter or the spot size of the operating beam, decreases. By increasing the distance between the first movable lens and the first window, it is alternatively possible to specify that the operating beam is convergent between the first movable lens and the second movable lens, and that the imaging ratio and hence the focus diameter of the operating beam increases.

At the same time as such a displacement of the first movable lens, to control the imaging ratio of the focusing device the focal position of the focussing device can also be adjusted by a corresponding displacement of the second movable lens, so that the focusing device remains focused on the work area. The deflection unit according to the invention allows any possible combination of the imaging ratio and the focal distance to be obtained within predetermined ranges by adjustment of the positions of the first movable lens and the second movable lens. Therefore the operating beam can always remain focused on the work area. In addition, the beam intensity of the operating beam, which is determined by the focal diameter, can also remain constant at different deflection angles, which in the case of a flat working area correspond to different working distances.

In preferred embodiments the deflection unit also comprises a control unit, which is configured to control displacements of the first movable lens and the second movable lens along the operating beam path. To this end, the control unit can be configured to adjust the focal length of the focussing device as a whole depending on a setting of the XY-deflection device and/or a working distance. The control unit can also comprise one or more drives, which are configured for the open-loop and closed-loop control of the axial positions of the first movable lens and the second movable lens. This allows a partially or fully automated control of the first and second movable lenses. The control unit can also be connected to a detection device to provide a fully automated control of the focussing of the deflection unit.

In some embodiments the deflection unit comprises one or more sliding mechanisms, which are configured for manually displacing the first movable lens and/or the second movable lens along the operating beam path. The sliding mechanisms allow a manual effect on the positioning of the first and/or second movable lenses and allow an adjustment range of the first and/or second movable lens covered by the control unit to be expanded. Therefore, a greater variation can be achieved in terms of possible focal positions and imaging ratios of the focussing device. In other preferred embodiments the optical element may have one or more of the following optical properties: a reflectance of ≥80%, preferably ≥90%, particularly preferably ≥99% for an operating wavelength, in particular a wavelength between 1020 nm and 1080 nm, a transmittance of ≥20%, preferably ≥70%, particularly preferably ≥90% for wavelengths between 400 nm to 900 nm, and a transmittance of >20%, preferably >70%, particularly preferably >90% for wavelengths between 1300 nm to 2100 nm. This means it is possible to direct a high-energy operating beam through the deflection unit at the operating wavelength exclusively or almost exclusively reflectively, so that little or no absorption heat is produced in the deflection unit. Low-energy detection beams with wavelength spectra in the range of 1300 nm to 2100 nm on the other hand, i.e. above a possible operating wavelength between 1020 and 1080 nm and in the range 400 nm to 900 nm, i.e. below a possible operating wavelength between 1020 and 1080 nm including possible illumination radiation at 850 nm, for example, can be transmitted through the optical element and thus spatially separated from the operating beam. The above-mentioned operating wavelength range (reflection range) is particularly advantageous for material processing. The wavelength ranges for possible detection beams (transmission ranges) allow a comprehensive evaluation of detection beams that are produced at the work surface and/or are reflected from the work surface.

According to an advantageous embodiment of the deflection unit according to the invention, the optical element is inclined in the detection beam path and an optical compensation element is additionally arranged in the detection beam path between the optical element and the first detection device, which at least partially compensates for an optical distortion, in particular an aberration and/or astigmatism, due to a transmission through the inclined optical element. Due to the transmittance and reflectance properties of the optical element and the inclination of the optical element, the detection beams can be separated from the operating beam. The transmission through an inclined optical element, i.e. one that is not perpendicular to the beam, can lead to an optical distortion or an astigmatism, however, which can lead to a blurred or imprecise detection with the first detection device. Due to the compensation this imaging error can be directly compensated, or at least reduced. If the detection device is a camera, for example, then the spatial resolution of the image can be improved and a subsequent electronic correction can be avoided. But in other detection devices also, for example, an optical coherence tomograph, the detection accuracy and/or sensitivity can be significantly increased. This enables a further improvement of the process efficiency, accuracy and reliability.

In some embodiments the optical element is formed by a first plane-parallel plate and the compensation element is formed by a second plane-parallel plate and both plates are inclined relative to the detection beam path. This allows a particularly simple, straightforward, accurate, passive and fast compensation.

In preferred embodiments the deflection unit comprises an optical apparatus which is configured for adjustment of the collimation, the focussing or a beam widening, depending on a setting of the XY-deflection device and/or a working distance, or which can be controlled for this purpose. This allows operating regions, i.e. imaged sections of the working surface at the site of the laser process, the detection beams of which due to the different deflection angles and/or due to different working distances travel different distances until their detection with the first detection device, to be detected and monitored with equal accuracy and sensitivity. This allows a flexible, versatile and accurate observation.

In accordance with some embodiments the deflection units are configured for processing at a working distance or working distances of between 238 mm and 850 mm, preferably between 238 mm and 671 mm, particularly preferably between 300 mm and 548 mm. The working distance is the distance between the exit or entrance area of the second window and a flat working surface below the second window, in which in the operating orientation of the deflection unit a flat working area in the working surface can be processed with the deflection unit and observed. "Can be processed" presupposes that the deflection unit can focus the operating beam over the entire flat working area. "Can be observed" presupposes that the deflection unit can detect any operating region within the working area which corresponds to the field of view of the first detection device, with the first detection device, or can image it onto a detection surface of the first detection device.

In some or a plurality of the above-mentioned embodiments, the deflection units have a working area with a size of 200×200 mm$^2$ to 600×600 mm$^2$, preferably up to 500× 500 mm$^2$. The working area corresponds to a planar region which is available for processing with the deflection unit at the respective working distance and which the deflection unit can scan with the focus of the operating beam. The working area can vary in size for different working distances.

Preferably, the deflection unit according to the invention is dimensioned and designed such that in the operating orientation its projection surface onto the plane of the working area extends over the working area on at least one side, on at least two sides, on at least three sides and/or on four sides. In other words, the working area can only extend partly beyond the "footprint", or else be fully contained within this. On each side at which the working area extends beyond the footprint, the working area, which can be, for example, rectangular or square, can be combined seamlessly with a working area of another deflection unit if the deflection units are suitably arranged side by side. This is particularly advantageous for a parallel processing, which allows the production time to be further reduced and favours mass production.

Some of the previously mentioned deflection units can also be dimensioned and designed such that four of these deflection units can be arranged so that for one or more working distances their working areas join together to form an uninterrupted smooth overall working area of 3.5 times to 4 times the size of the individual working areas. In the case of a laser-based additive manufacturing process, this allows the production of components up to four times larger.

Alternatively some of the previously mentioned deflection units can also be dimensioned and designed such that four of these deflection units are arranged so that for one or more working distances their working areas join together to form an uninterrupted smooth overall working area which is smaller than an individual working area. Thus, for a 100% overlap of the respective working areas, the size of the overall working area can be, for example, ⅔ of the size of a single working area. In the case of a laser-based additive manufacturing process, this allows the production time to be reduced by up to 4-fold. This may allow the usually high output rates of established methods, such as for example casting, to be almost reached or in the long term even reached.

According to some embodiments the deflection units can also be dimensioned and designed such that two of these deflection units can be arranged such that their working areas are superimposed on a common working area, wherein the common working area has a surface area at least equal to 50%, preferably at least 60%, particularly preferably at least 70% of the surface area of each individual working area. Therefore, deflection units working in parallel must not necessarily work in parallel on separate working areas adjacent to each other, but can also operate in parallel on a common working area or a common part of a working area. This allows the process efficiency to be further increased and the quality of the components to be improved, for example, if one of the deflection units working in parallel is used to correct the errors of the other deflection unit.

In some embodiments the deflection unit comprises a first detection device, which is or comprises a camera. These embodiments comprise an imaging optical system for imaging the work area on the camera, wherein the imaging optical system comprises the above-mentioned optical apparatus. In these embodiments the optical apparatus is configured to vary the focal length of the imaging optics. This allows the process to be visually observed and monitored.

In the above embodiments, the imaging ratio derived from the area of the operating region imaged on the camera at the working distance and the area of the camera chip can have a value between 1.7 and 0.5, preferably 0.8. These ratios allow a particularly favourable compromise between a required spatial resolution for a sufficiently accurate process monitoring, a minimum number of camera pixels for a sufficiently fast readout, a reasonably large camera chip (imaging in the range 1:1) for a good light intensity and yield, a sufficiently large camera field of view on the work surface for monitoring a sufficiently large operating region, and a minimum imaging path length for a compact design of the deflection unit.

In some advantageous embodiments, the camera has a chip with a size of ⅔" or 8.8 mm×6.6 mm, which has, in particular, 1280×1024 pixels, and the imaged surface area of the operating region, which corresponds to the camera field of view at the working distance, has a size of between 8 mm×6 mm and 14 mm×10.5 mm. This chip size allows a sufficiently high frame rate, or time resolution, of the monitoring process. In addition, the imaged area is sufficiently large for a process evaluation and a sufficiently large optical or spatial resolution is ensured.

In some of the above-mentioned embodiments an imaging path length, which the detection beams or imaging beams traverse from entry into the imaging optics to the camera chip, is between 400 mm and 700 mm, preferably between 420 mm and 600 mm, particularly preferably between 450 mm and 510 mm, in particular 480 mm. Such path lengths allow a relatively compact design and, at the same time, an optimal compromise between spatial resolution (which is correlated with the imaging ratio, sharpness or degree of distortion freedom, number of pixels), speed or frame rate (which correlates with the number of pixels), the size of the imaged area (which correlates with the imaging ratio, the chip size) and a minimally complex imaging optics (number and type of lenses), which can therefore be comparatively robust and inexpensive. A compact design is particularly advantageous for parallelised laser processes, i.e. the manufacture or processing of a component at the same time using a plurality of laser beams and deflection units, because the deflection units can be arranged next to each other more closely, so that their working areas partially overlap or are adjacent to each other.

In one or more of the above embodiments the camera allows an image acquisition rate of ≥500 Hz, preferably ≥1 kHz, particularly preferably ≥1.5 kHz, in particular ≥2 kHz. This allows the process to be monitored and examined with a high time resolution, so that even the smallest defects can be detected, examined and if necessary, corrected.

Furthermore, the deflection unit according to the invention can comprise an illumination device, which is arranged and aligned to illuminate the entire working area with the second wavelength at the same time, in particular with a homogeneity of ≥80%. This eliminates the need for the illumination beams to be scanned, so that static illumination can be used in the direction of the work area and in relation to the work area. Compared to a scanned illumination, in these embodiments the process can have a high reliability and robustness. In addition, a comparatively high illumination homogeneity can be obtained, so that consistent imaging conditions exist for different regions.

In the above-mentioned embodiments the illumination device can also be configured for a flashed illumination. The light intensity can be increased as a result, and a longer service life of the lamps can be obtained for increased light intensity.

In some embodiments, the illumination is flashed in such a way that the images are each recorded by the camera during a light flash and the flash duration is greater than or equal to the image acquisition period of the camera. This ensures that even when only a small portion of the entire illuminated area, sufficient light intensity is available for recording an image.

The off-time of the illumination is preferably greater than or equal to the on-time of the illumination. This allows excessive heating to be avoided, thus increasing the service life and process accuracy and process reliability.

Some of the above-mentioned embodiments also comprise a frame grabber, to which the camera is connected. The frame grabber permits a faster readout and further processing of the camera images, which further refines and improves the process monitoring, and the process efficiency can also be increased accordingly.

In some alternative embodiments the first detection device is or comprises an optical coherence tomograph (OCT). The optical coherence tomograph allows detection and observation of existing height differences and/or of height differences that arise during the process or due to the process. This is an alternative to the process monitoring by camera. In other embodiments, the first detection device may also comprise other detection devices, which can be operated advantageously with the adjustable optical apparatus.

Some of the above-mentioned embodiments of the deflection unit according to the invention also comprise a second optical element and a second detection device, wherein the second optical element is arranged in the detection beam path between the optical element and the first detection device, at least partially reflects the second wavelength for forwarding to the first detection device and at least partially transmits other wavelengths for forwarding to the second detection device. As a result, in addition to the direct observation and monitoring by means of the first detection device, an additional process monitoring can be carried out continuously throughout the production period, which can supply additional information or monitor other process parameters. An open-loop or closed-loop control process intervention on the basis of this extended monitoring can therefore contribute to a further improvement in the process efficiency and quality.

The second optical element can have one or more of the following optical properties: a reflectance of ≥80%, preferably ≥90%, particularly preferably ≥95% for an illumination wavelength between 630 nm and 670 nm or between 820 nm and 870 nm, preferably at an angle of incidence of 45°, a transmittance of >20%, preferably >70%, particularly preferably >90% for wavelengths between 400 nm and 700 nm, a transmittance of >20%, preferably >70%, particularly preferably >90% for wavelengths between 1300 nm and 2100 nm. The aforementioned spectrally extended transmission ranges of the first and second optical element, in addition to the observation with the first detection device, enable a further observation, carried out locally in parallel at certain wavelengths or integratively over one or more larger wavelength ranges, such as the integrative method of a light intensity measurement by means of a photodiode.

The second detection device can comprise a photodiode, a pyrometer, a second camera, preferably a VIR camera and/or a multi-spectral camera for creating a radiation and/or heat map (heatmap generation), a thermal image sensor and/or an optical coherence tomograph.

The deflection unit according to the invention and its above-mentioned embodiments are particularly well suited to additive manufacturing, in particular for "Direct Powder Fusion", vat photopolymerization and/or "Direct Energy deposition". These processes also include Selective Laser Melting (SLM) and Laser Metal Deposition (LMD). They can also be used for other applications, however. The present invention is not limited to these applications.

The present invention further relates to a use of a deflection unit in accordance with one or more of the above-mentioned embodiments for additive manufacturing, in particular for "Direct Powder Fusion", vat photopolymerization and/or "Direct Energy Deposition".

BRIEF DESCRIPTION OF THE DRAWINGS

Further advantages and features of the present invention will be explained in more detail in the following description by reference to the attached figures.

In the figures, equivalent features are labelled with the same reference numerals.

DETAILED DESCRIPTION OF EXEMPLARY EMBODIMENTS

Figure 1:
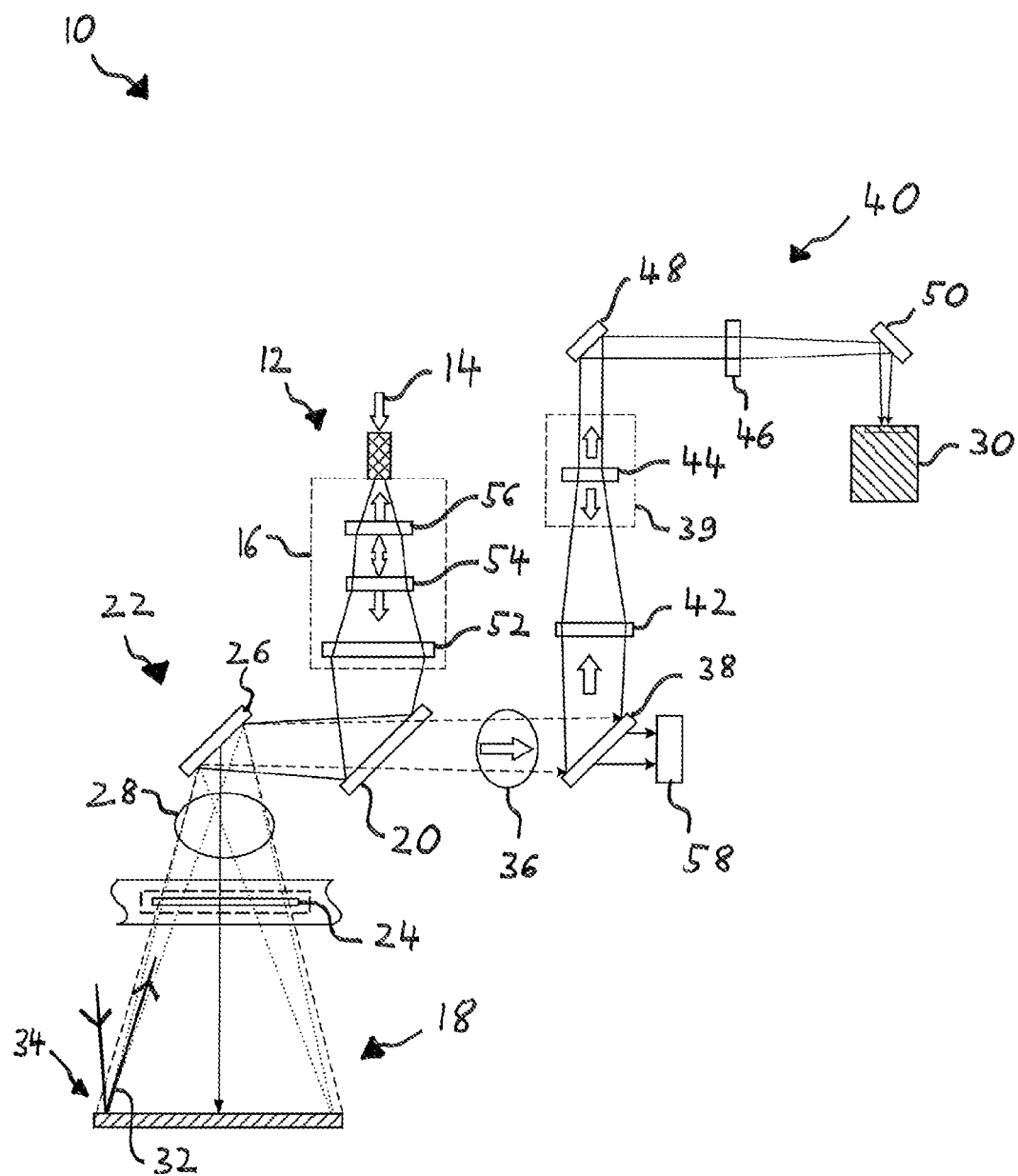
FIG. 1 shows the schematic structure of a deflection unit according to an embodiment according to the invention.

FIG. 1 shows a schematic structure of a deflection unit 10 according to an embodiment according to the invention. The deflection unit 10 comprises a first window 12, through which an optical operating beam 14 can enter the deflection unit 10. The first window 12 is arranged inside a fibre-optic connector, via which a fibre laser or a fibre-optic connection can be connected to the deflection unit 10. In other embodiments, the operating beam 14 can enter the deflection unit 10 as a free beam, without the need to provide a fibre-optic connector.

The deflection unit 10 also comprises a focussing device 16 to focus the operating beam 14 on a work surface 18, an optical element 20 to reflect the operating beam 14, an XY-deflection device 22 to scan the operating beam over the work surface 18, and a second window 24, through which the operating beam can exit from the deflection unit 14. The above-mentioned elements 16, 20, 22, 24 are arranged along an operating beam path in the deflection unit 10 and are traversed in the above sequence by an operating beam 14 which enters the deflection unit 10, or else they reflect the operating beam 14 in the above-mentioned sequence.

The XY-deflection device 22 comprises a first scanning mirror 26 and a second scanning mirror 28, which are configured to deflect and scan the operating beam 14 in an X-direction and/or in a Y-direction.

The deflection unit 10 also comprises a first detection device in the form of a camera 30, which is arranged within the deflection unit 10 to detect detection or imaging beams 32, which are reflected from an operating region 34 within the work surface 18. The detected image beams 32 traverse a detection or image beam path from the work surface 18 to the camera 30, on which the imaging beams 32 traverse the following elements in sequence or are reflected by them: the second window 24, the XY deflection device 22, the optical element 20, a compensation element 36, a second optical element 38, and an optical apparatus 39. The optical apparatus 39 forms part of an imaging optical system 40. The optical apparatus 39 is configured to change the focal length of the imaging optical system 40.

In some embodiments the optical apparatus 39 is a collimation device, which ensures that the image beams 32 are collimated at a particular point in the imaging beam path between the apparatus 39 and the camera 30 at different image distances. In other embodiments, however, the imaging beams 32 do not need to be collimated, or not everywhere, between the apparatus 39 and the camera 30. As a result of an adaptability, adjustability or variability of the apparatus 39 this is variable or adjustable and a collimation, widening and/or focussing of the image beams 32 between the apparatus 39 and the camera 30 can be kept constant in the event of a changing image distance.

The second window 24 can comprise a transparent sheet for the operating beam 14 and imaging beams 32. This can protect the interior of the deflection unit 10 against pollution or contamination and also provide a thermal insulation, in order to prevent an excessive heat input from the working surface 18 into the deflection unit 10. In other embodiments, the second window 24 can also comprise an opening without material therein, through which an air or fluid connection between the interior and the exterior of the deflection unit 10 is produced.

In the embodiment of FIG. 1 the imaging optical system 40, as shown in FIG. 1, comprises two lenses 42, 46, the optical apparatus 39, which comprises an additional lens 44, and two deflecting mirrors 48, 50, to image the operating region 34 over an imaging path length of the imaging optics 40 onto a chip of the camera 30. The imaging path length is defined by the optical path length that the imaging beams 32 travel from the entrance to the imaging optics 40 until they strike the chip of the camera 30. In FIG. 1 the imaging path length corresponds to the optical path which the imaging beams traverse from the entry lens 42 to the camera chip. It should be pointed out that in other embodiments the imaging optical system 40 can have a different structure, and in particular, may comprise more or fewer lenses and/or mirrors which can be arranged differently than is shown in FIG. 1.

In the deflection unit 10 the variable focal length of the imaging optical system 40 is achieved by an ability to move the lens 44. The lens 44 is part of the optical apparatus 39, which can be, for example, a high-speed collimation, widening or focussing device. The lens 44 can be moved back and forth at high speed along the direction of the imaging beams 32 at the location of the lens 44. As a result, even under rapid changes in the path length from the operating region 34 to the camera 30 for the imaging beams 32, a consistently sharp image is possible during the scanning with simultaneously high time resolution of the monitoring.

Figure 2:
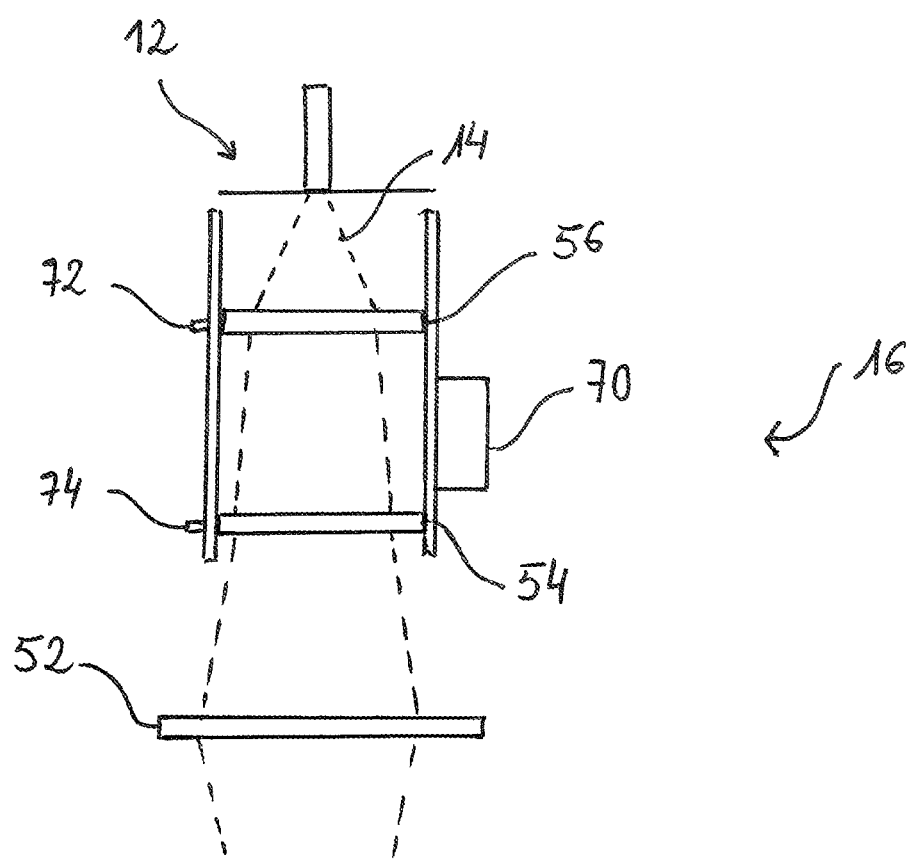
FIG. 2 shows the detailed structure of the focussing device of the deflection unit of FIG. 1.

The focussing device 16, which is shown in greater detail in FIG. 2, also comprises a variable focal length. In the embodiment of FIGS. 1 and 2 the focussing device comprises a fixed lens 52 for focussing the operating beam 14, a first movable lens 56 and a second movable lens 54. The focusing device 16 can be controlled so that the first movable lens 56 and the second movable lens 54 move along the operating beam path independently of each other. In addition, the first movable lens 56 and the second movable lens 54 can move along the operating beam path jointly and in the same direction. This changes the focal length for the operating beam 14, i.e. the distance of the focus of the operating beam 14 from the reflection point of the second scanning mirror 28 changes. This is particularly advantageous because when scanning the operating beam over the working surface 18, the distance from the respective operating region 34 to the XY deflection device 22, and hence the optical path length which the operating beam 14 travels from the focussing device 16 to the respective operating region 34, changes. Via a change of the focal length it is possible to compensate for this change in the optical path length, so as to ensure that the operating beam 14 remains focused on the working surface 18 during the entire scanning process. In the case of a flat working area 18, this is also referred to as "plane-field compensation". The variable focal length also allows an adaptation to different working distances between the work surface 18 and the deflection unit 10.

The second movable lens 54 is arranged 14 after or behind the first movable lens 56 in the beam direction of the operating beam, and the fixed lens 52 is arranged after the first and second movable lenses 54, 56 in the beam direction of the operating beam 14. With regard to the choice of the fixed lens 52 for focussing, the area within which the working distance is adjustable and for which the deflection unit 10 is designed can be determined. If the fixed lens 52 has a shorter focal length, then the working distance is adjustable around a shorter mean working distance, and vice versa. The working distance range corresponds to the range of distances between the plane of the second window 24 and the working surface 18, for which the operating beam 14 can be focussed on an associated working area within the working surface 18 and for which 32 an imaging of the working area in the plane of the chip of the camera 30 can be performed via the respective imaging beams. The size of the working area is obtained from the respective working distance and the angular range, within which the operating beam 14 can be deflected using the XY deflection device 22.

As shown in FIG. 2, the focussing device 16 of the illustrated embodiment of the deflection unit according to the invention comprises a control unit 70, which is configured to control the displacement of the first movable lens 56 and the second movable lens 54 along the operating beam path. In addition, the focussing device 16 comprises a first manual sliding mechanism 72 and a second manual sliding mechanism 74, which are configured to manually displace the first movable lens 56 and the second movable lens 54 respectively along the operating beam path. The first moveable lens 56 and the second movable lens 54 can be displaced along the operating beam path within the respective adjustment ranges by activating the sliding mechanisms 72 and 74 and/or the control unit 70, which comprises separate drives (not shown) for this purpose.

The distance between the object-side main plane of the first movable lens 56 and the first window 12, through which the operating beam 14 enters the optical system, differs from the focal length of the first moveable lens by more than 10% in the embodiment shown. In addition, the focal lengths and the positions of first movable lens 56 and the second movable lens 54 are selected such that no intermediate focus exists within the focussing device 16.

In the embodiment shown, the first movable lens 56 has a positive focal length. The second movable lens 54 has a negative focal length, and the fixed lens 52 has a positive focal length. With the present distance between the first movable lens 56 and the first window 12, this means that the operating beam 14 between the first movable lens 56 and the second movable lens 54 in the embodiment shown is divergent.

The imaging ratio of the focusing device 16 can be reduced by reducing the distance between the first movable lens 56 and the first window 12, for example by activating the sliding mechanism 72 or by means of a corresponding sliding movement of the first movable lens 56 controlled by the control unit 70. This causes a reduction in the size of the focus diameter of the operating beam 14, so that the beam intensity of the operating beam incident on the working area 18 increases. By increasing the distance between the first movable lens 56 and the first window 12, a corresponding enlargement of the focal diameter of the operating beam 14 can be implemented. Therefore, the beam intensity on the working area 18 is reduced.

The location of the second movable lens 54 can be adjusted so that the virtual image of the first window 12 generated by the first 54 and the second movable lens 56 is at a distance from the object-side main plane of the fixed lens 52, which in accordance with the lens equation, taking into account the focal length of the fixed lens 52 corresponds to the distance between the image-side main plane of the fixed lens 52 and the desired focal position, i.e. the working surface 18. In other words, the virtual image of the first window 12 generated by the first 54 and the second movable lens 56 is at a distance from the object-side main plane of the fixed lens 52 which corresponds to a distance that equalizes the distance resulting from the lens equation between focus and image-side main plane of the fixed lens 52 to the distance that matches the desired focal position.

In the embodiment shown in FIG. 2 the first movable lens 56 has a focal length of 63 mm, while the second movable lens 54 has a focal length of 68 mm. The fixed lens 52 has a focal length of 126 mm. The positions of the first movable lens 56 and the second movable lens 54 can be controlled and determined by the control unit 70 within an adjustment range of 11 mm, so that the distance between the first movable lens 56 and the second movable lens 54 can vary between 564 mm and 586 mm. In addition, the distance between the first movable lens 56 and the first window 12 can be adjusted in a range between 60 mm and 71 mm.

In one exemplary embodiment the working area can have any size from 200×200 mm$^2$ to 600×600 mm$^2$, preferably up to 500×500 mm$^2$, wherein the adaptation to the respective size of the working area can be made using the focussing device 16.

In the embodiment of FIGS. 1 and 2, the movable lenses 54, 56 can also be controlled in such a way that they move in opposite directions along the operating beam path, so that only the focal diameter changes and the focal position or the distance from the focus to the XY deflection device 22 does not change. In other words, the focal diameter can be changed without changing the beam caustic at the same time. The movable lenses 54, 56 can be positioned so that the focal position is maintained in the event of variations in the operating beam diameter, or vice versa.

The above two types of control can also be combined with each other, so that it can be ensured that depending on the respective working distance and the current angle of deflection or scan angle, which is specified by the current setting of the XY-deflection device 22, the operating beam is focused on the work surface 18 throughout the entire scanning process, wherein at the same time the focal diameter can be varied independently of the focal position throughout the entire scanning process. This allows a very flexible and advantageous process design, because the intensity of the operating beam on the work surface 18 can be adapted rapidly and in a controlled manner to suit modified process conditions or requirements, such as a modified grain size of the powder in the additive assembly process, or a modified scan speed.

In other less preferred embodiments, the focussing device 16 can also comprise only one movable lens for adjusting the focal length.

The above-mentioned structure of the deflection unit 10 according to the invention allows a particularly advantageous combined performance of a laser work process, for example an additive manufacturing by fusion, sintering or melting of powder grains in a powder bed, and a simultaneous process observation and process monitoring of the laser work process by means of the camera 30.

The operating principle and advantages of the deflection unit 10 will be explained in more detail in the following.

The optical element 20, which is arranged in both the imaging beam path and in the image beam path, reflects the wavelength of the operating beam 14 and is at least partially transparent to the wavelength of the imaging beams 32. As a result, the imaging beams 32, which initially enter the deflection unit 10 in the opposite direction to the operating beam 14 on the operating beam path through the second window 24, are spatially separated from the operating beam 14 and after the separation are forwarded via the optical apparatus 39 to the camera 30. In other words, the imaging beam path and the operating beam path, viewed in the beam direction of the operating beam 14 (downstream direction), are superimposed behind the optical element 20 and in the opposite beam direction to the operating beam 14 (upstream direction), separated behind the optical element 20.

In some embodiments the optical element (20) not only reflects a first wavelength, at least partially, but a first wavelength range at least partially, and/or not only transmits another second wavelength at least partially, but one or more other wavelength ranges, at least partially. These one or more other wavelength ranges can be below and/or above the first wavelength range or the first wavelength.

In the example of FIG. 1, the optical element 20 consists of a plane-parallel plate, which is inclined in the imaging beam path. The angle between the surface normal to the plane parallel plate and the imaging beam path can be, for example, 45°.

In some embodiments, the operating wavelength for which the optical element 20 is reflecting is in the range between 1020 nm and 1080 nm, for example, 1070 nm. The imaging beams 32 in some embodiments are provided by an illumination (not shown in FIG. 1), which can be arranged below the XY-deflection device 22 around the operating beam path and which illuminates the working surface 18. In some embodiments an illumination wavelength of 850 nm is used, for which the optical element 20 is transparent, or at least partially transmissive.

In an exemplary embodiment, the reflectivity of the optical element 20 at 45° for the wavelength of 1070 nm is over 99% and the transmission in the wavelength range from 400 nm to 900 nm is >20%, preferably >70%, particularly preferably >90%, and the transmission for the wavelength range from 1300 nm to 2100 nm is >20%, preferably >70%, particularly preferably >90%. Due to the fact that wavelengths other than the illumination wavelength of, for example, 850 nm can also be transmitted, further properties can be observed and documented, which will be discussed further below.

Since the operating beam path and the imaging beam path are superimposed in the direction downstream of the optical element 20, the XY-deflection device 22 is used simultaneously for scanning the operating beam 14 and for deflecting the imaging beams 32, which are reflected from the location of the respective operating region 34 to the XY deflection device 22, to the camera 30. As a result, during the operating process, the field of view of the camera 30 is scanned jointly and synchronously with the operating beam 14 over the work surface 18, so that the respective operating region 34 is reproduced at the size of the viewing field of the camera 30 on the work surface 18 on the camera chip, and the progress of the process can be monitored and controlled online.

It should be pointed out that the quantities "camera field of view", "working area" and "working distance" (in which a focussing of the operating beam 14 is possible) are defined by the deflection unit and are not dependent on the presence of a working surface 18. The camera field of view and the working area correspond to angular ranges in relation to incident beams or outgoing beams, wherein these angular ranges each correspond to a surface area at a given working distance.

During the scanning process, as previously described, using the focussing device 16 the operating process can be flexibly designed and varied, in particular, a plane-field compensation and a variation of the focal spot size on the working surface 18 can be performed independently of each other. It should be pointed out that on non-planar surfaces 18 the focusing device 16 can also ensure that the focus is on the work surface 18 during the scanning and can be enlarged and reduced independently of the focal position.

In a similar way, via a corresponding control of the movable lens 44 a change in the focal length of the imaging optical system 40 can be made during the scanning. This enables, for different deflection angles of the XY-deflection device 22 during the scanning and for different working distances between the deflection unit 10 and the working surface 18, the focal length to be set and adjusted in each case such that the working area 34 is imaged in sharp focus on the camera chip at different distances from the XY deflection device 22. In other words, the optical apparatus 39 of the imaging optical system 40 allows that the image plane always coincides with the chip plane, and the respective working field can therefore be sharply imaged on the plane of the camera chip with high spatial resolution.

In the present description the optical apparatus 39 and the focussing device 16 relate to such elements as are arranged in one of the separated beam paths, i.e. in the upstream direction of the optical element 20, regardless of whether further lenses are arranged jointly in the operating and imaging beam path in the downstream direction of the optical element 20, which while affecting the focussing of the operating beam 14 and collimation of the imaging beams 32, do not temporally modify or adjust them.

Because the optical apparatus 39 and the focussing device 16 are spatially separated from each other and each arranged only in the imaging beam path or only in the operating beam path, the adjustment of the operating beam 14 by means of the focussing device 16 does not have any effect on the imaging beams 32 to be imaged and the adjustment of the imaging by the optical apparatus 39 does not affect the operating beam 14. As a result of this decoupling, the operating process and its observation can be varied simultaneously and independently of each other, without the need to take into account the control of the optical apparatus 39 for controlling the focussing device 16, and vice versa. This means that both the operating process as well as the monitoring can be carried out at the same time in combination with each other more efficiently, more flexibly, more robustly and with greater fault tolerance.

Due to the transmission of the imaging beams 32 through the optical element 20 which is inclined in the imaging beam path, an optical distortion may result, for example in the form of an astigmatism. As a result, the spatial resolution of the image of the operating region 34 on the camera chip may be degraded. The compensation element 36 is used to compensate for this optical distortion.

In the deflection unit 10 of FIG. 1, in which the optical element 20 consists of a plane-parallel plate, the compensation element 36 also consists of a plane-parallel plate with a corresponding optical thickness for the imaging beams 32, which is arranged in the imaging beam path with the same inclination but rotated relative to the optical element 20 with an angle of 90° about the optical axis of the imaging beam path. In other words, the plane formed by the surface normal of the optical element 20 and the optical axis of the imaging beams at the location of the optical element 20 is perpendicular to the plane formed by the surface normal of the compensation element 36 and the same optical axis of the imaging beams at the location of the compensation element 36. This enables the distortion to be compensated or at least reduced and the operating region 34 to be imaged at least approximately free of distortion, so that the spatial resolution of the process monitoring can be improved.

The inclination of the compensation element 36 and/or the optical element 20 to the optical axis of the imaging beams can be, for example, 45°.

In the deflection unit 10 the field of view of the camera at a working distance of 300 mm has a size of 6 mm×8 mm. The chip has a size of ⅔" or 8.8 mm×6.6 mm and has 1280×1024 pixels. The pixel resolution therefore amounts to approximately 6 µm. The inventors have discovered that this allows an optimal compromise to be achieved between spatial image resolution and temporal resolution of the process monitoring for preferred applications in the field of additive manufacturing. It is true that with a larger number of pixels combined with a larger imaging path length and a larger chip, or combined with more complex imaging optics, the spatial resolution can be further increased. However, despite an increase in the number of pixels, the temporal resolution worsens.

The working distance is the distance between the second window 24 and the working surface 18 during the operating process. The operating region 34 with a size of 6 mm×8 mm is imaged using the imaging optical system 40 on the 8.8 mm×6.6 mm camera chip, wherein the imaging ratio (=(6 mm×8 mm)/(8.8 mm×6.6 mm) is approximately 0.8). The imaging path length, which the image beams 32 travel from entering the imaging optics 40, i.e. from the lens 42, until striking the camera chip, is 480 mm. This imaging path length of merely 480 mm allows the operating region 34 with a size of 6 mm×8 mm to be imaged on the camera chip with a less complex and robust optical system at an optical resolution of approximately 15 µm. Although a larger imaging path length does allow a higher spatial optical resolution, it does not allow such a compact design of the deflection unit 10. The above-mentioned imaging path length allows a sufficiently optimized sharpness of image and, in particular, a sufficiently high light intensity, or irradiance, on the chip.

The imaging path length of 480 mm offers a particularly advantageous compromise between a compact design, a sufficiently large camera field of view at the working distance, a sufficiently high image acquisition rate during the operating process and an imaging at a very high spatial resolution. This imaging path length allows a sufficiently optimized sharpness of image and, in particular, a sufficiently high light intensity for illuminating the chip.

An area of 6 mm×8 mm is large enough, in a laser operating process, in particular a laser-based additive assembly process, to observe the process itself with a sufficiently large process environment.

For a good structural representation the imaged structures should be at least twice as large as the spatial resolution. The optical resolution of 15 µm therefore allows structures up to a size of approximately 30 µm to be spatially resolved. This is particularly advantageous in additive manufacturing processes with powders, in which the grain size can be as low as 45 µm but is usually not below this value. The imaging path length of 480 mm therefore provides the necessary spatial resolution for a reliable and accurate spatial evaluation of such operating processes.

At the same time the imaging path length of only 480 mm allows a high compactness of the deflection unit 10, which is required in particular for a parallel operating mode. In a parallel operation a plurality of deflection units participate in a joint assembly process at the same time and to do so, they must be arranged relatively close to each other.

The high speed of the image recording, which is enabled by the combination of imaging path length of 480 mm with the camera chip of ⅔", is also particularly advantageous for a laser-based additive manufacturing process. The scanning speed with which the operating beam is scanned over the powder grains or other material, can be relatively high, e.g. 4 m/s, so that a high image acquisition rate is required to monitor the process without interruption.

The camera 30 consists, for example, of a high-speed CMOS camera with an image acquisition rate of 1 kHz to 2 kHz. In order to sustain the high image acquisition rate continuously and constantly over a long period of time, the camera 30 can be connected to a frame grabber.

The illumination is preferably flashed and also synchronized with the image recording of the camera 30. The duration of a light flash in the deflection unit 10 is preferably longer than the image acquisition period of the camera 30. This means that every light flash can homogeneously illuminate the entire working area which is available for processing by the deflection unit 10 and at the same time each image, which can only form a small region of the illuminated area, can be recorded with a sufficiently high brightness.

In addition, the off-time of the illumination is preferably greater than the on-time of the illumination. This allows an excessively strong heating to be avoided. This contributes to an extension of the service life and a higher process reliability.

A static, i.e. not scanned, simultaneous illumination of the total area of the working area, which is preferably used, allows a robust operation and uniform illumination conditions for the entire working area.

The deflection unit 10 also preferably comprises one or more control units (not shown), which are configured to control the focussing device 16 and the optical apparatus 39 depending on the setting of the XY-deflection unit 22 and/or to adjust or control the working distance, and therefore—as described above—to control the operating process and the monitoring process.

In addition to the process monitoring using the camera 30 the deflection unit 10 of FIG. 1 comprises an additional monitoring capability by means of a photodiode 58. The photodiode 58 is arranged behind the second optical element 38, which spatially divides the imaging beam path into a first beam path to the camera 30 and a second beam path to the photodiode 58. In this case, the illumination wavelength, which can be 850 nm for example, as described above, is reflected by the second optical element 38 and other wavelengths, which are transmitted by the first optical element 20, are also transmitted by the second optical element 38, so that they can be detected collectively using the photodiode 58.

In an exemplary embodiment the second optical element 38 has a reflection of over 99% in the wavelength range from 820 nm to 870 nm and at an angle of incidence of 45°, has a transmission of over 94% in the wavelength range from 400 nm to 700 nm and has a transmission of over 93% in the wavelength range from 1200 nm to 2100 nm. This means the photodiode 58 can be used to monitor how much radiation intensity is produced at the location of the operating process in these wavelength ranges (400-700 nm and 1200-2100 nm) or parts thereof, which allows additional properties and parameters of the operating process to be monitored.

In other embodiments, instead of the photodiode 58 another detection device can be provided, for example a pyrometer, a VIR camera which is sensitive to the visible and the infrared wavelength range, and/or a multi-spectral camera for creating a radiation map or heat map, a thermal image sensor or an optical coherence tomograph.

In such embodiments, in which the other detection device comprises an optical coherence tomograph, a coherence detection can be carried out by the coherence tomograph emitting a first partial illumination beam through the second optical element 38, which after passing through the first optical element 20 is superimposed with the operating beam and after a reflection from the working surface 18 is redirected back to the optical coherence tomograph. There the reflected first partial illumination beam is superimposed with a second partial illumination beam, and an interference pattern is detected using a photodiode. From an analysis of the interference pattern it is possible to determine a surface topography. In this case, the surface topography can be determined both immediately before the operating process and immediately afterwards, thus allowing an additional monitoring capability of the operating process to be provided.

Other embodiments comprise only a camera 30 for the process monitoring and do not have a photodiode 58 nor any other detector device for an additional process monitoring. In these embodiments, the second optical element 38 can be formed by a mirror, which only reflects but does not transmit.

Still other embodiments of the deflection unit according to the invention that are not shown comprise only an optical coherence tomograph for the process monitoring and/or process observation, namely as a first detection device instead of the camera 30 shown in FIG. 1. These embodiments do not therefore need a photodiode 58 or any other detector device for an additional process monitoring. In these embodiments, the second optical element 38 can be formed by a mirror, which only reflects but does not transmit. The coherence detection can be carried out as previously described, but with the difference that the first partial illumination beam sent by the coherence tomograph is not transmitted by the second optical element 38, but is reflected at this, in order then to be steered in the direction of the working surface 18.

Figure 3:
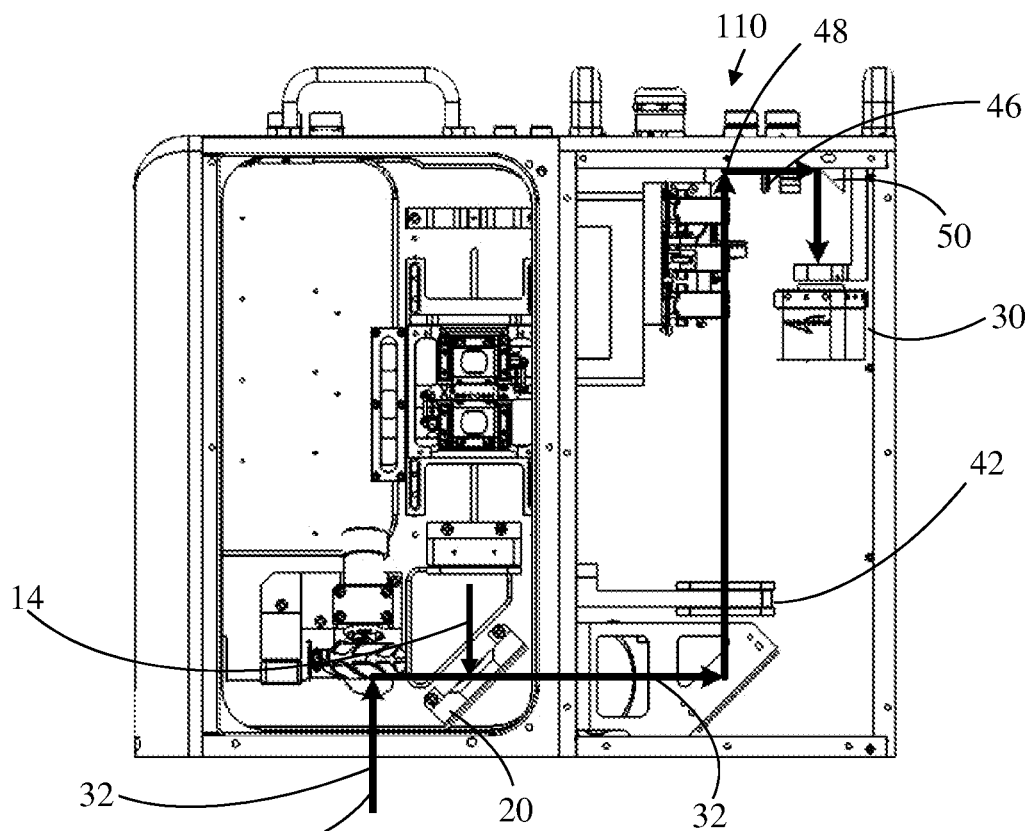
FIG. 3 shows a deflection unit according to a further embodiment according to the invention.

FIG. 3 shows a cross-sectional view of such a deflection unit 110, which has only one camera 30 for process monitoring. As shown in FIG. 3, via a deflection of the imaging beam path within the imaging optical system 40 using the deflecting mirrors 48, 50 a more compact design of the deflection unit 110 with the smallest possible imaging path length is enabled, which offers the previously described advantages.

Figure 4:
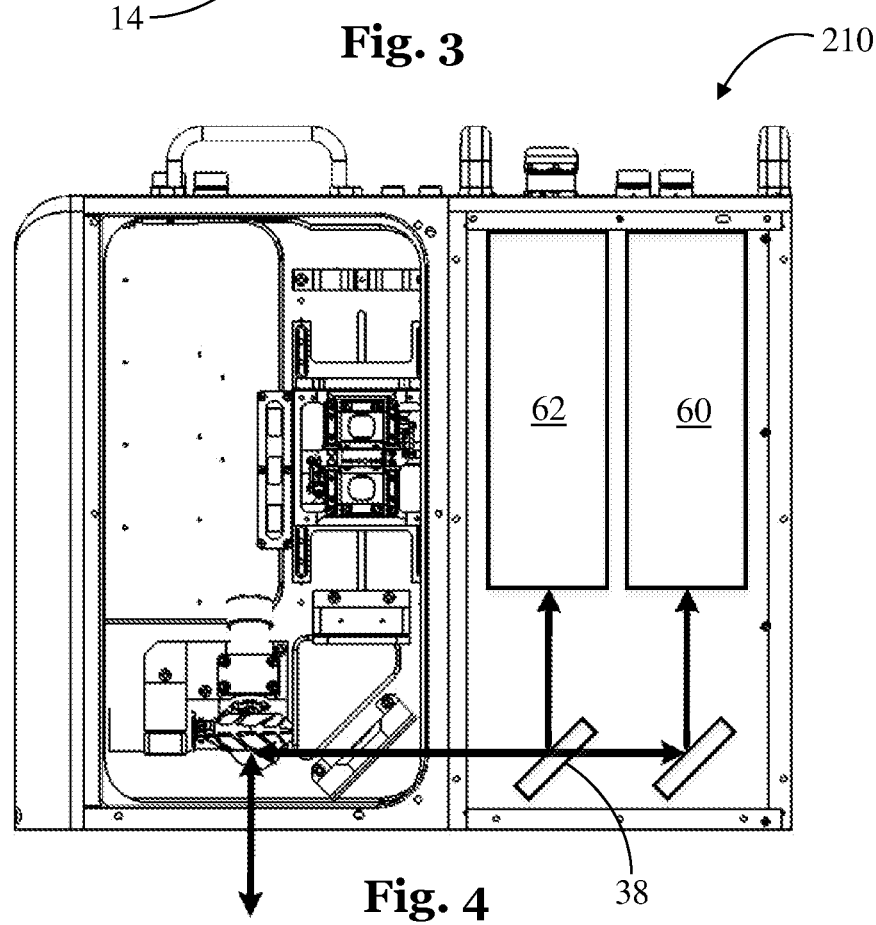
FIG. 4 shows a deflection unit according to a further embodiment according to the invention.

FIG. 4 shows a cross-sectional view of a deflection unit 210 in accordance with another embodiment, which in contrast to the deflection unit 10, instead of the photodiode 58 comprises a thermal image sensor which can be used to compile a heat map of the process environment. The camera module 62 shown in FIG. 4 comprises the previously described optical apparatus 39 and the camera 30. Instead of the camera module 62 an OCT module can also be provided, comprising an OCT and the previously described optical apparatus 39.

Figure 5:
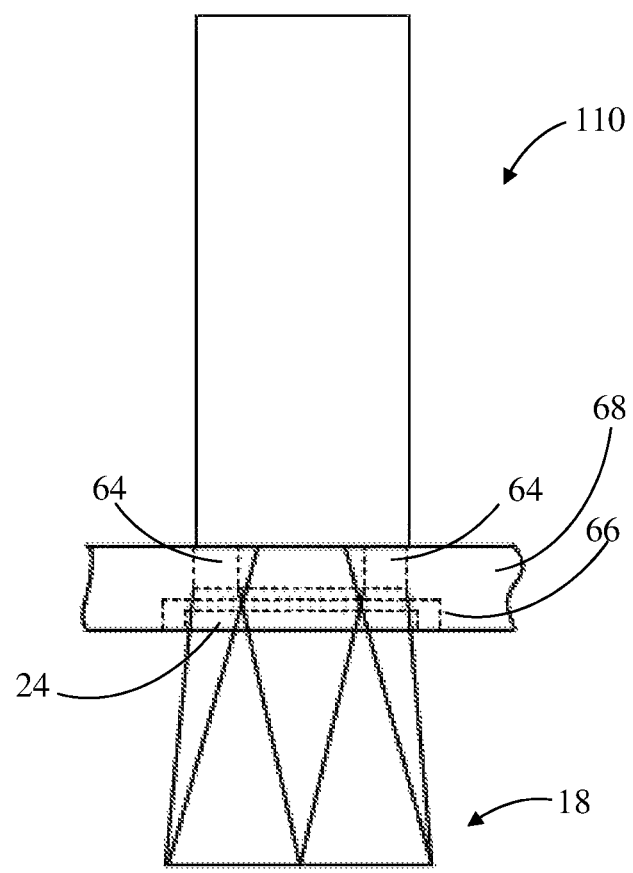
FIG. 5 shows an external view of a deflection unit in accordance with an embodiment according to the invention.

FIG. 5 shows an external view of the deflection unit 110 including an illumination 64, which is arranged annularly, for example in the shape of a circular ring, in a square annular shape or in a different annular shape, around the operating beam path and which is configured to illuminate the working surface 18 through the second window 24, homogeneously and in a flashed mode. The second window 24 comprises a protective glass, which is held within a support frame 68 by means of a bracket 66. The support frame 68 can comprise a water cooling system to protect the interior of the deflection unit 10 from excessive heating.

As shown in FIG. 5, the illumination 64 is preferably arranged externally, i.e. outside of an interior of the deflection unit 110, so that the illuminating beams do not illuminate the working surface 18 through the deflection unit 110, or not through its interior. In addition, the illumination 64 is mounted statically in relation to a housing of the deflection unit 110 and the illuminated beams are not scanned. This enables scattered radiation and heating to be prevented or reduced within the deflection unit 110, and the process can be made more robust and reliable.

Figure 6:
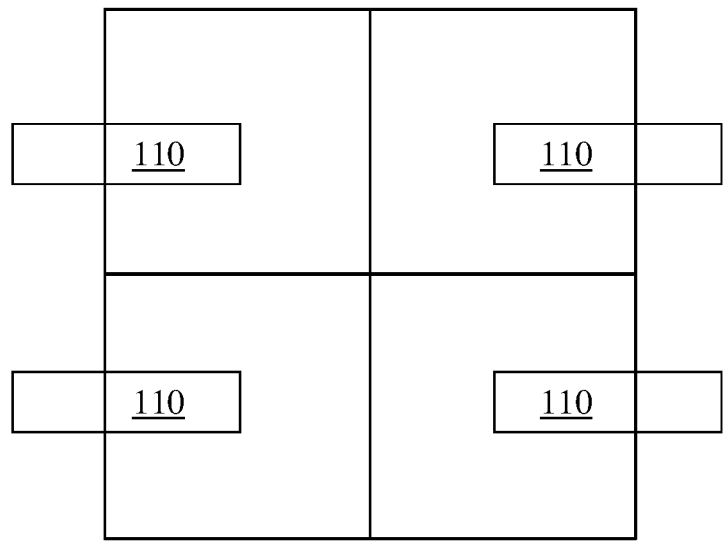
FIG. 6 shows a schematic plan view of an arrangement of four deflection units in accordance with an embodiment according to the invention of a parallel production.

FIG. 6 shows a plan view of four deflection units 110, which are arranged side-by-side for parallel operation. In the arrangement shown, the working areas of adjacent deflection units 110 adjoin each other seamlessly and can even partially overlap in the transition region. This means the working areas of the deflection units can be combined to form an overall working area, which can be up to 4 times the size of a single working area. On the combined total working area, in a parallelized operating mode each of the deflection units 110 can process its own sub-region to produce a corresponding part of a relatively large component. This arrangement and the corresponding capability for parallelized working are made possible by the fact that each of the deflection units 110 has a working area that extends beyond the projection surface of the deflection unit 110 in plan view to the plane of the working area. The parallel operation on a larger working area using a plurality of deflection units allows the production of larger components in less time.

Figure 7:
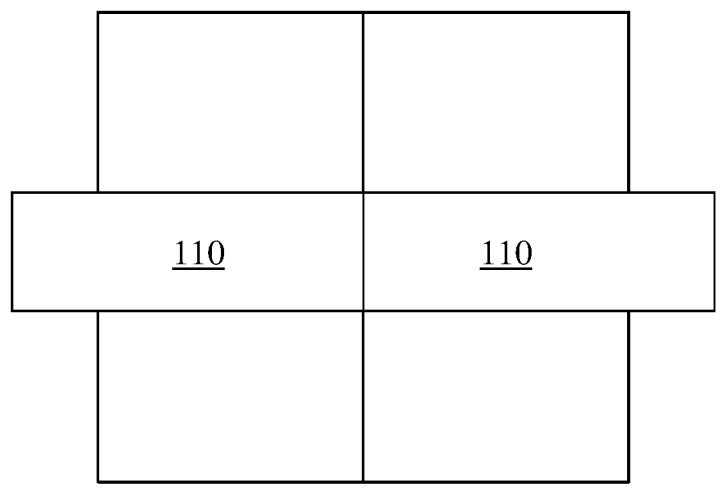
FIG. 7 shows a schematic plan view of an arrangement of two deflection units in accordance with an embodiment according to the invention of a parallel production.

Another option for parallelized working is shown in FIG. 7. FIG. 7 shows a plan view of two deflection units 110, which are arranged next to each other such that their working areas are overlaid on a common working area, which can be processed jointly and simultaneously by both deflection units 110. The design of the deflection unit can be so compact, in particular, the projection surface of the deflection unit 110 in the plan view direction, also designated as the "footprint", can be so small in comparison to the working area and the working area can extend so far beyond the footprint, that the common superimposed working area corresponds to at least 50% of the size of the working area of a deflection unit 110. In some embodiments, the common superimposed working area can even comprise 70% or more of the area of a single working area.

Therefore, the deflection units can be used particularly efficiently for an accelerated manufacture of components, which can also be produced with a single deflection unit, but not over such a short period or in such good quality.

In other embodiments, the projection surface of the deflection unit onto the plane of the working area can also lie completely within the working area. Unlike the FIGS. 6 and 7 show, these deflection units can be arranged in such a way that their working areas overlap on all four sides with a working area of another of these deflection units.

It should be pointed out that the embodiments described above are purely provided as examples of the present invention, which is not limited thereby. The scope of protection of the present invention is defined solely by the attached claims.

LIST OF REFERENCE NUMERALS

10, 110, 210 deflection unit
12 first window
14 operating beam
16 focussing device
18 working surface
20 optical element
22 XY deflection device
24 second window
26 first scanning mirror
28 second scanning mirror
30 camera
32 imaging beams
34 operating region
36 compensation element
38 second optical element
40 imaging optical system
39 optical apparatus
42, 44, 46 lens
48, 50 deflecting mirrors
52, 54, 56 lens
58 photodiode
60 thermal image sensor
62 camera module
64 illumination
66 bracket
68 support frame
70 control unit
72 manual sliding mechanism
74 manual sliding mechanism

The invention claimed is:

1. A deflection unit comprising
a first window, through which an optical operating beam enters the deflection unit,
a second window, through which the operating beam exits from the deflection unit and through which detection beams enter the deflection unit from an operating region along the respective trajectory of the emerging operating beam and in the opposite direction thereto,
an optical element, which at least partially reflects a first wavelength, wherein the deflection unit defines an operating beam path traversed by the operating beam from the first window to the second window via a reflection at the optical element, and wherein the deflection unit further comprises
an XY deflection device, which is arranged in the operating beam path between the second window and the optical element, in order to deflect the operating beam, and to scan the operating beam that has emerged, and
a focusing device for focusing the operating beam, wherein the focusing device has a variable focal length and is arranged in the operating beam path between the first window and the optical element,
wherein the focusing device comprises a first movable lens, a second movable lens and a fixed lens, wherein the second movable lens is arranged after the first movable lens in the beam direction of the operating beam and wherein the fixed lens is arranged after the first movable lens and the second movable lens in the beam direction of the operating beam.

2. The deflection unit according to claim 1, in which the focusing device is configured to change the focal length as a function of a setting of the XY-deflection device and/or a working distance.

3. The deflection unit according to claim 1, in which the focusing device is configured to move one or both of the first movable lens and the second movable lens jointly along the operating beam path.

4. The deflection unit according to claim 1, in which the focusing device is configured to change a focusing diameter of the operating beam, without at the same time changing the focus position.

5. The deflection unit according to claim 4, in which the focusing device is configured to move the first movable lens and the second movable lens independently of each other at the same time.

6. The deflection unit according to claim 1, in which a distance between the object-side main plane of the first movable lens and the first window does not differ from the focal length of the first lens by more than 50%.

7. The deflection unit according to claim 3, in which a distance between the first movable lens and the second movable lens is selected such that the axial position of a virtual image produced by the first movable lens and by the second movable lens is variable within a range, which corresponds to the adjustment range of the second movable lens, wherein the second movable lens is movable along the operating beam path within the adjustment range.

8. The deflection unit according to claim 1, in which the first movable lens has a positive focal length, the second movable lens has a negative focal length, and the fixed lens has a positive focal length.

9. The deflection unit according to claim 1, wherein the focal lengths and the positions of the first movable lens and the second movable lens are selected in such a way that the focusing device has no focus located between the first movable lens and the fixed lens.

10. The deflection unit according to claim 3, further comprising a control unit, which is configured to control displacements of a first movable lens and a second movable lens along the operating beam path.

11. The deflection unit according to claim 3, further comprising one or more sliding mechanisms, which are configured for the manual displacement of a first movable lens and/or a second movable lens along the operating beam path.

12. The deflection unit according to claim 1, in which the optical element has one or more of the following optical properties:
- a reflectance of ≥80%, for an operating wavelength between 1020 and 1080 nm,
- a transmittance of >20%, for wavelengths between 400 nm to 900 nm,
- a transmittance of >20%, for wavelengths between 1300 nm to 2100 nm.

13. The deflection unit according to claim 1, which is configured for operating with a working distance or working distances between 238 mm and 850 mm.

14. The deflection unit according to claim 1, which has a working area of size 200×200 mm$^2$ to 600×600 mm$^2$.

15. The deflection unit according to claim 1, which is dimensioned and designed such that in the operating orientation its projection surface onto the plane of the working area extends over the working area on at least one side, on at least two sides, on at least three sides and/or on four sides.

16. The deflection unit according to claim 1, which is dimensioned and designed such that four of these deflection units are arrangeable so that for one or more working distances their working areas join together to form a non-interrupted flat total working area of 3.5 times to 4 times the size of the individual working areas.

17. The deflection unit according to claim 1, which is dimensioned and designed such that two of these deflection units are arrangeable so that their working areas are superimposed on a common working area, wherein the common working area has a surface area at least equal to 50% of the surface area of each individual working area.

18. A deflection unit comprising
- a first window, through which an optical operating beam enters the deflection unit,
- a second window, through which the operating bean exits from the deflection unit and through which detection beams enter the deflection unit from operating region along the respective trajectory of the emerging operating beam and in the opposite direction thereto,
- an optical element, which at lest partially reflects a first wavelength, wherein the deflection unit defines an operating beam path traversed by the operating beam from the first window to the second window via a reflection at the optical element, and wherein the deflection unit further comprises
- an XY deflection device, which is arranged in the operating beam path between the second window and the optical element, in order to deflect the operating beam, and to scan the operating beam that has emerged, and
- a focusing device for focusing the operating beam, wherein the focusing device has a variable focal length and is arranged in the operating beam path between the first window and the optical element, wherein
- the optical element additionally at least partially transmits at least one other second wavelength;
- wherein the deflection unit also comprises a first detection device, wherein the deflection unit also
  - defines a detection beam path, which the detection beams traverse from the second window to the first detection device, wherein the detection beams are at least partially transmitted by the optical element, and comprises an optical apparatus which is arranged in the detection beam path between the optical element and the first detection device and which is configured to change a focal length for the detection beams;
- wherein the XY deflection device is arranged in the operating beam path and in the detection beam path between the second window and the optical element, in order to deflect the operating beam and to scan the emerging operating beam and at the same time to deflect the detection beams, so that they traverse the detection beam path through the optical element as far as the first detection device.

19. The deflection unit according to claim 18, in which the optical element is inclined arranged in the detection beam path and which additionally comprises an optical compensation element in the detection beam path between the optical element and the first detection device, which at least partially compensates for an optical distortion due to a transmission through the inclined optical element.

20. The deflection unit according to claim 19, in which the optical element is formed by a first plane-parallel plate and the compensation element is formed by a second plane-parallel plate and both plates are inclined relative to the detection beam path.

21. The deflection unit according to claim 18, in which the optical apparatus is configured for adjustment of the collimation, the focus or a beam expansion depending on one or both of a setting of the XY deflection device and a working distance.

22. The deflection unit according to claim 18, in which the first detection device is or comprises a camera and which comprises an imaging optics for imaging the operating region on the camera, wherein the imaging optics comprises the optical apparatus and the optical apparatus is configured to change the focal length of the imaging optics.

23. The deflection unit according to claim 22,
wherein the imaging ratio of the imaged area of the operating region at the working distance and the surface area of a camera chip has a value of between 1.7 and 0.5.

24. The deflection unit according to claim 22, in which the camera has a chip with a size of ⅔" or 8.8 mm×6.6 mm, and in which the imaged surface area of the operating region at the working distance has a size of between 6 mm×8 mm and 10.5 mm×14 mm.

25. The deflection unit according to claim 22, wherein an imaging path length, which the detection beams traverse from entry into the imaging optics to a camera chip, is between 400 mm and 700 mm.

26. The deflection unit according to claim 22, in which the camera allows an imaging acquisition rate of ≥500 Hz.

27. The deflection unit according to claim 22, which additionally comprises an illumination device in order to illuminate the entire working field with the second wave length at the same time.

28. The deflection unit according to claim 27, in which the illumination device is configured for a flashed illumination.

29. The deflection unit according to claim 28, in which the illumination is flashed in such a way that the images are each recorded by the camera during one light flash and the flash duration is greater than or equal to the image acquisition period of the camera, and in which the off-time of the light is greater than or equal to the on-time of the light.

30. The deflection unit according to claim 22, which further comprises a frame grabber to which the camera is connected.

31. The deflection unit according to claim 18,
in which the first detection device is or comprises an optical coherence tomograph.

32. The deflection unit according to claim 18, which additionally comprises a second optical element and a second detection device, wherein the second optical element is arranged in the image beam path between the optical element and the first detection device, at least partially reflects the second wavelength for forwarding to the first detection device, at least partially transmits other wavelengths, for forwarding to the second detection device.

33. The deflection unit according to claim 32, in which the second optical element has one or more of the following optical properties:
- a reflectance of ≥80% for an illumination wavelength between 630 nm and 670 nm or between 820 nm and 870 nm,
- a transmittance of >20% for wavelengths between 400 nm and 700 nm, a transmittance of >20% for wavelengths between 1300 nm to 2100 nm.

34. The deflection unit according to claim 32, in which the second detection device comprises one or more of a photodiode, a pyrometer, a second camera, a thermal image sensor and an optical coherence tomograph.

35. The deflection unit according to claim 1 for additive manufacturing.

36. A deflection unit comprising
a first window, through which an optical operating beam enters the deflection unit,
a second window, through which the operating bean exits from the deflection unit and through which detection beams enter the deflection unit from operating region along the respective trajectory of the emerging operating beam and in the opposite direction thereto,
an optical element, which at lest partially reflects a first wavelength, wherein the deflection unit defines an operating beam path traversed by the operating beam from the first window to the second window via a reflection at the optical element, and wherein the deflection unit further comprises
an XY deflection device, which is arranged in the operating beam path between the second window and the optical element, in order to deflect the operating beam, and to scan the operating beam that has emerged, and
a focusing device for focusing the operating beam, wherein the focusing device has a variable focal length and is arranged in the operating beam path between the first window and the optical element,
wherein the focusing device comprises at least two movable lenses and is configured to move the at least two lenses along the operating beam path independently of each other at the same time,
wherein the focusing device is configured to change a focusing diameter of the operating beam without at the same time changing a focus position of the operating beam.

37. The deflection unit according to claim 36, further comprising a control unit configured to control displacements of the at least two movable lenses along the operating beam path to adjust a focal length of the focusing device as a whole depending on a setting of the XY-deflection device and/or a working distance.

* * * * *